United States Patent [19]

Petersen et al.

[11] 4,152,405

[45] May 1, 1979

[54] CO-CURRENT ABSORBER FOR RECOVERING INORGANIC COMPOUNDS FROM PLANT EFFLUENTS

[75] Inventors: Alfred W. Petersen; John M. Stewart, both of Salt Lake City, Utah

[73] Assignee: Stauffer Chemical Company, Westport, Conn.

[21] Appl. No.: 556,050

[22] Filed: Mar. 6, 1975

Related U.S. Application Data

[62] Division of Ser. No. 367,923, Jun. 7, 1973, Pat. No. 3,893,830.

[51] Int. Cl.$^2$ ............................................. C01B 33/08
[52] U.S. Cl. .............................. 423/341; 423/321 R; 423/484; 423/489
[58] Field of Search ............... 423/341, 489, 321, 483, 423/240, 484; 55/236

[56] References Cited

U.S. PATENT DOCUMENTS

| | | | |
|---|---|---|---|
| 3,091,513 | 5/1963 | Parish | 423/483 |
| 3,522,833 | 8/1970 | Mustian et al. | 423/321 |
| 3,640,685 | 2/1972 | Goller | 423/341 |

*Primary Examiner*—L. Dewayne Rutledge
*Assistant Examiner*—Michael L. Lewis
*Attorney, Agent, or Firm*—Harry A. Pacini

[57] ABSTRACT

Co-current absorber for recovering inorganic compounds from plant effluents, particularly useful for recovery of fluorine values as low phosphorus fluosilicic acid from phosphate plant effluents. Improved co-current absorber utilizing multiple cyclonic entrainment separators, co-current flow and renewed droplet surfaces.

1 Claim, 6 Drawing Figures

CO-CURRENT ABSORBER FOR RECOVERING INORGANIC COMPOUNDS FROM PLANT EFFLUENTS

This is a division, of application Ser. No. 367,923, filed June 7, 1973, now U.S. Pat. No. 3,983,830.

BACKGROUND OF THE INVENTION

In the manufacture of concentrated phosphate fertilizer, the phosphate ore is initially subject to extraction with sulfuric acid by the "wet process". The resulting dilute phosphoric acid is concentrated by boiling and then used for the production of concentrated liquid and granular phosphate fertilizers. During the extraction of phosphoric acid from the phosphase ore by sulfuric acid, the reaction produces hydrogen fluoride. In the presence of silica, the hydrogen fluoride is converted to fluosilicic acid.

A large quantity of the fluorine remains in the dilute phosphoric acid as hydrogen fluoride and fluosilicic acid. When the dilute phosphoric acid is concentrated by boiling, much of the fluorine is evolved with the steam as hydrogen fluoride and silicon tetrafluoride vapors in variable amounts depending upon the variety of the crude phosphate ore. The toxicity of both compounds in itself demands careful purification of the waste gases. Furthermore, the waste gases form a valuable raw material source for obtaining fluorine values in the form of inorganic fluorine compounds. From some phosphate plants, as much as 10,000 to 30,000 tons per year of fluorine compounds may be liberated in gaseous plant effluents, which should be captured to prevent air and water contamination. In recent years, both air and surface water pollution laws and regulations have been more stringent and have been more vigorously enforced. The present invention contributes to the prevention of contamination of air and surface water by various inorganic fluorine compounds being produced during the extraction of phosphate rock.

A principle object of the present invention is to provide an apparatus for recovering inorganic fluorine compounds from phosphate plants. An additional objective of the present invention is to control by recovery, the gaseous fluorine containing vapors produced during the concentration of phosphoric acid. A further objective of the invention is to provide an apparatus and process for recovery of fluorine in a valuable useable form.

Other objects and advantages of the invention will appear from the following description of preferred embodiments of the invention, with reference to the accompanying drawings showing the improved condenser and overall schematic flow diagram of the invention.

DISCUSSION OF PRIOR ART

Prior to the present invention, one method of recovering fluorine values is described in U.S. Pat. No. 3,091,513. U.S. Pat. No. 3,091,513 employs a counter-current scrubbing system with high pressure-drop sprays. The present invention presents certain advantages among others over U.S. Pat. No. 3,091,513, especially less power required to recirculate liquid using low head pumping means. By using efficient cyclonic de-entrainment, fluosilicic acid having low phosphate content can be produced for use in water treatment or aluminum production. The valuable de-entrained phosphoric acid is recommended for use in fertilizer production. Further, the co-current flow described herein requires a smaller diameter vessel than the counter-current flow of the spray system technique taught in the prior art.

Another method described in the prior art for recovering fluorine values in the concentration of phosphoric acid is described by I. I. Zaring, *Zhurnal Khimicheskai Promyhennosti*, March 1936, pp. 266–271. This prior art describes an absorption reaction between the fluorine-rich vapors and an aqueous spray. Further, this article teaches the use of counter-current flow of the vapors through a condenser. By means of the process of this article, entrained phosphoric acid is not removed by the treatment in the counter-current flow condenser. By using efficient cyclonic entrainment in a co-current flow system as described in the present invention, low phosphate fluosilicic acid can be obtained.

BRIEF DESCRIPTION OF THE DRAWINGS

FIG. I is a schematic flow diagram showing one preferred embodiment employing the improved condenser of the present invention.

FIG. II is a cut-away drawing of the improved co-current absorber of the invention for recovering inorganic compounds from plant effluents.

Figure 1:
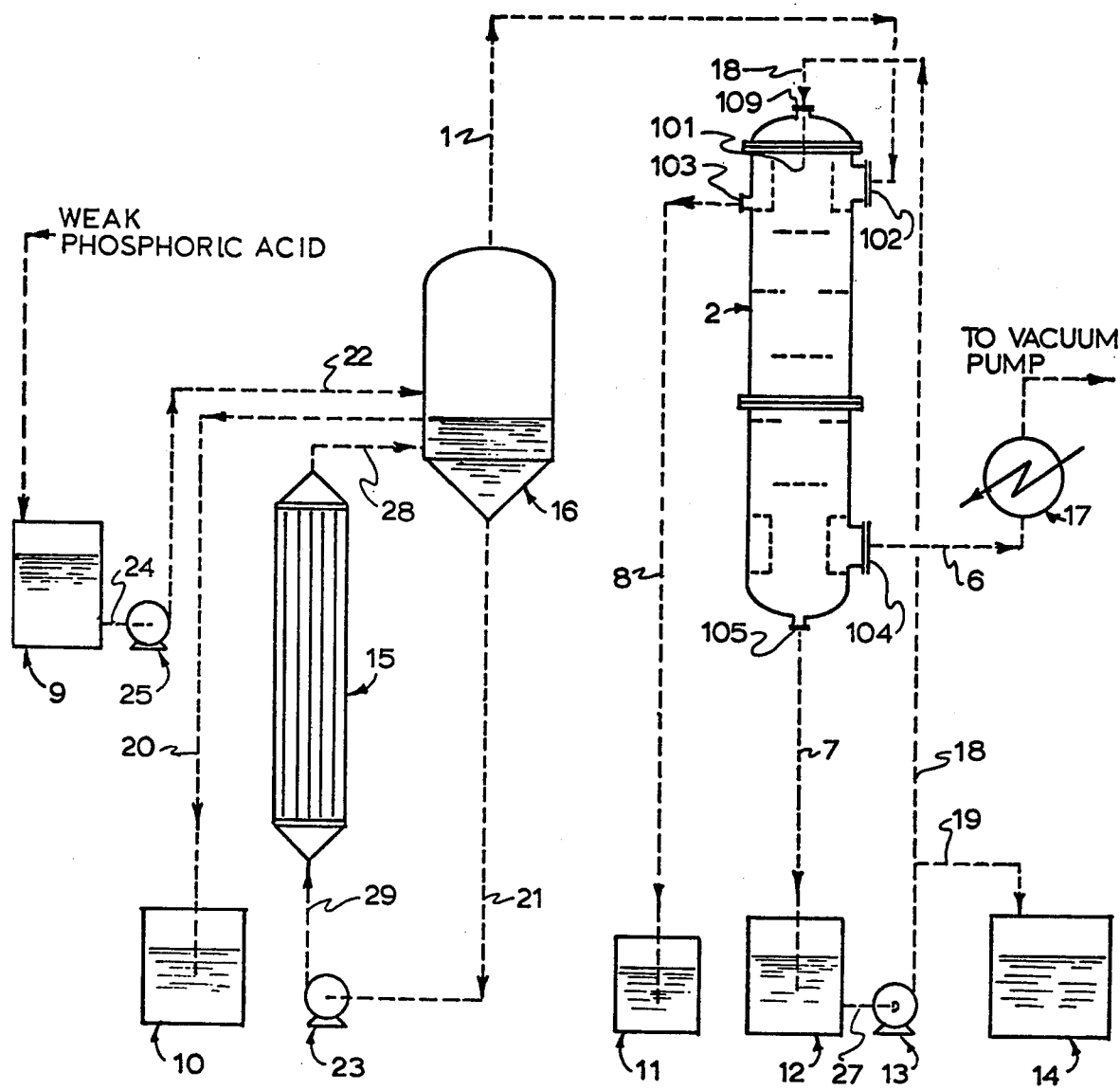
Figure 2:
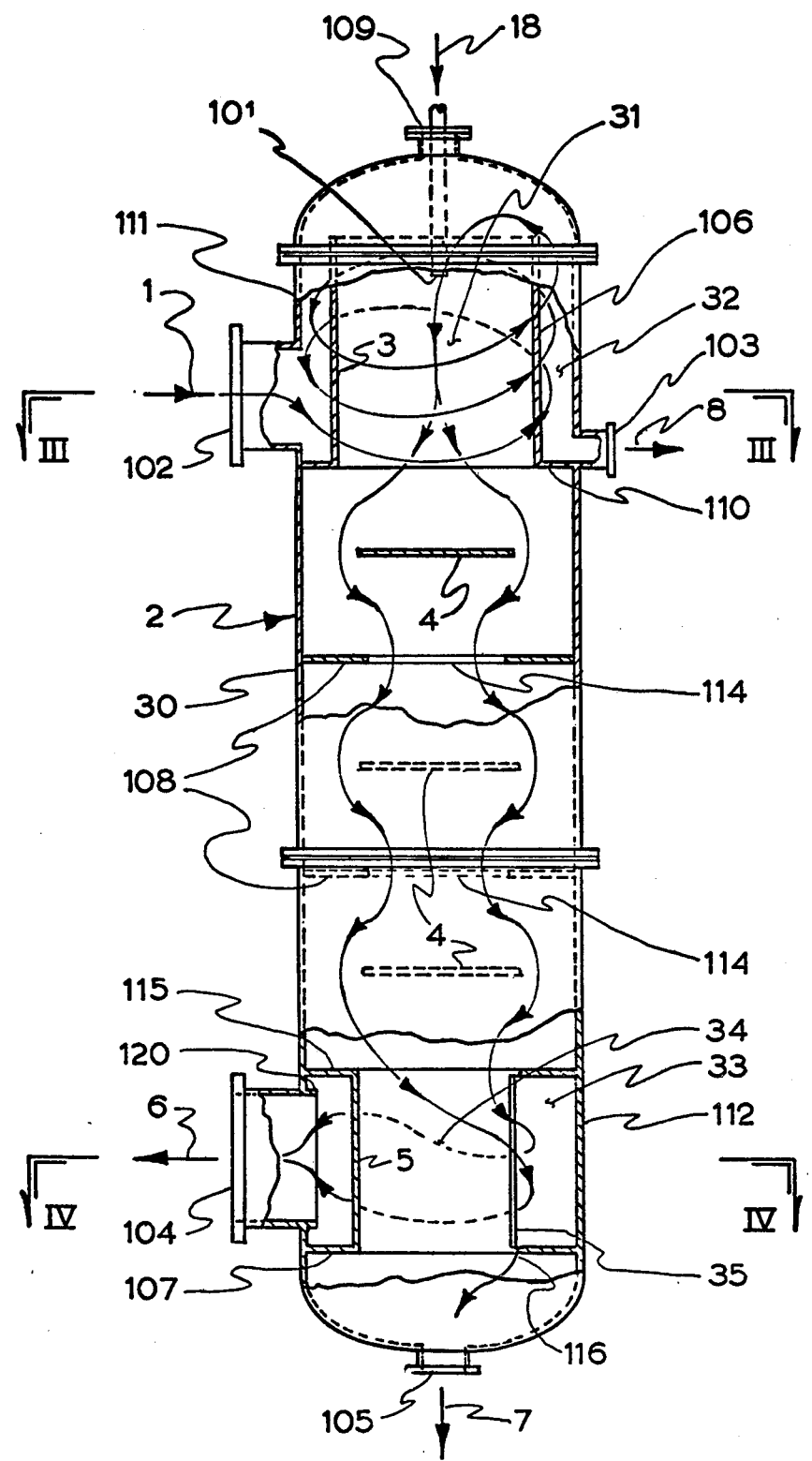
Figure 3:
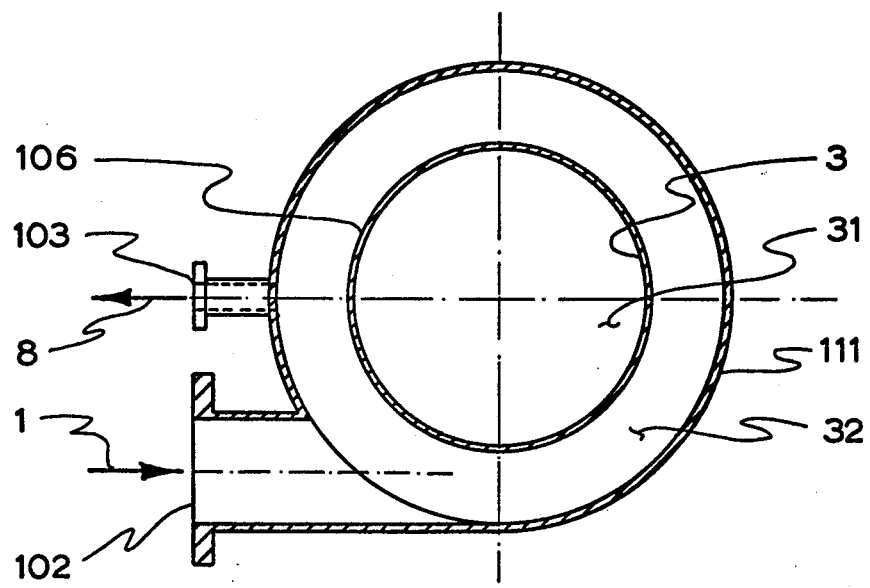
Figure 4:
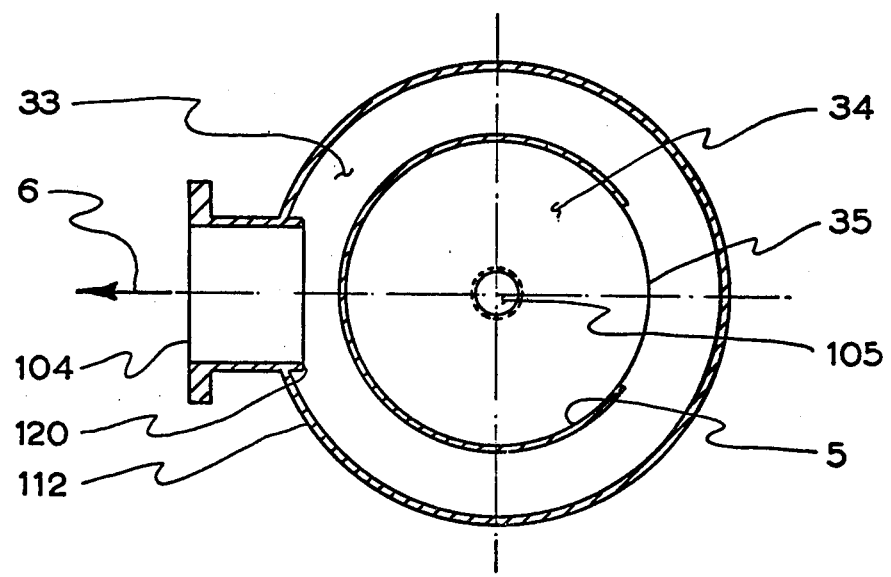
Figure 6:
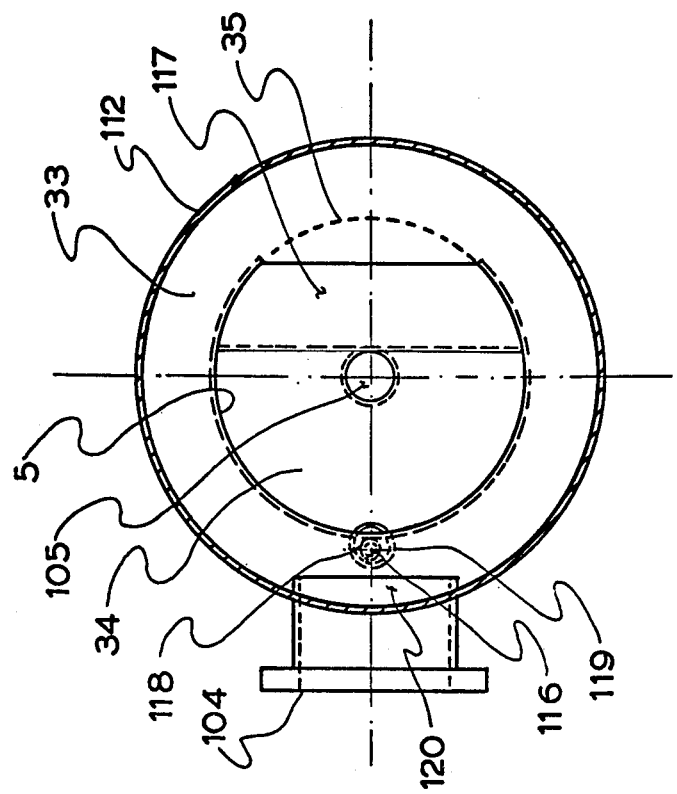
Figure 5:
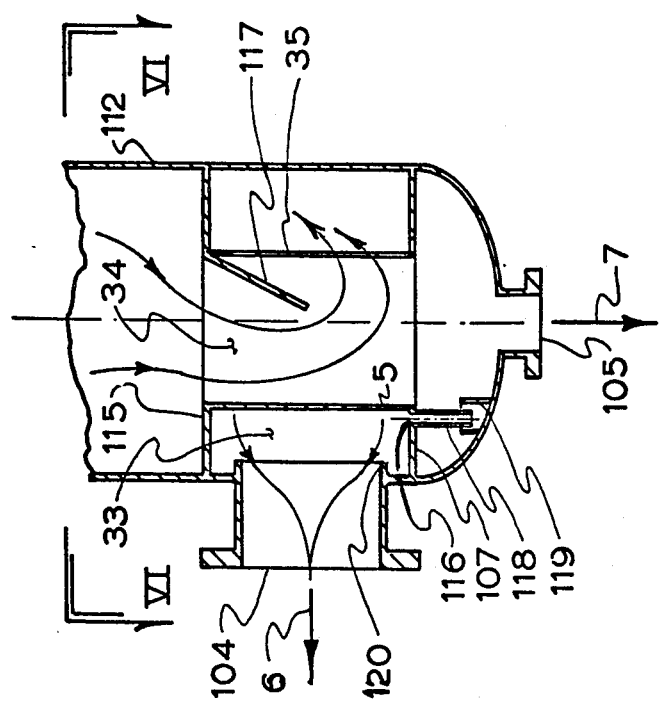

FIG. III is a cross-section on line III—III of FIG. II.

FIG. IV is a cross-section on line IV—IV of FIG. II.

FIG. V is a cross-section view of a mofidication of the lower section of the absorber of FIG. I.

FIG. VI is a cross-section on line VI—VI of FIG. V.

DESCRIPTION OF THE INVENTION

Referring to the flow diagram in FIG. I of the drawings, at the start-up of the system, the heater 15, the evaporator 16 and circulation pipe 21 are filled with phosphoric acid to a designated level. The level of the acid in the evaporator 16 is kept constant and is regulated by overflow from a barometric leg, pipe 20. Then, water is introduced into the condenser 17, and with a vacuum pump (not shown), a vacuum is created in the system. The phosphoric acid circulation pump 23 is started and steam is then introduced into the heater 15. With this, the acid in the tubes of the heater overheats and changes into a vapor-acid mixture, which flows in a continuous stream from the heater 15 into the evaporator 16. In the evaporator 16 the acid loses vapors and drains into the circulation pipe 21. In this way, the system has an uninterrupted circulation of acid from the circulation pipe 21 into the heater 15 through pump 23 and line 29, then into the evaporator 16, and from the evaporator 16 again into the circulation pipe 21 to have the process repeated. When the acid in the circulation pipe 21 reaches a given concentration, dilute acid is introduced continuously into the system from the feed vessel 9 for the weak phosphoric acid source (not shown) through pipe 24, pump 25 and pipe 22.

The concentrated acid, having reached the overlow level, continuously drains through pipe 20 from the evaporator 16 into the collecting vessel 10 for concentrated acid. In the process prior to the instant invention, the vapor separating in the evaporator 16 continuously flowed into the condenser 17 with the aid of the vacuum pump (not shown). In this manner, the system worked continuously, but resulted in fluosilicic acid recovered which contained varying amounts of entrained phosphoric acid.

To recover fluorine from vapor from plant effluent such as a phosphoric acid plant, a vessel 2, hereinafter called the co-current absorber, is added to the concentration flow diagram and apparatus described above. It is preferably placed between the evaporator 16 and the condenser 17. The vapor separating in the evaporator 16 goes from the evaporator 16 through pipe 1 to the top of the co-current absorber 2, through entrance port 102, is contacted with a recirculating liquor. The vapor is contacted with a recirculating liquor in the co-current absorber 2 and exits through pipe 6 from the co-current absorber 2. The vapor enters the condenser 17 where it is condensed. The condenser 17 is maintained at a temperature sufficiently low enough to condense all the vapors. Thus, the possibility of contamination of air has been effectively removed.

At the start-up of the recovery system, the circulating liquor vessel 12 is filled with water and the centrifugal pump 13 is activated. Then the co-current absorber 2 is irrigated with liquid brought into the co-current absorber 2 by the centrifugal pump 13 through pipe 18 from the circulating liquor vessel 12. The vapor entering the upper section of the co-current absorber 2 from the evaporator 16 is drawn through the co-current absorber 2 and irrigated with liquor from pipe 18 by outlet 101 with the aid of the vacuum pump. The water soluble components of the vapor are absorbed by the recirculating liquor.

In the case of plant effluents from a wet process phosphoric acid plant, the vapors are absorbed to make fluosilicic acid according to the following reactions. Silicon tetrafluoride reacts with water as shown by the equation:

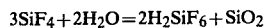

Hydrogen fluoride reacts with silica to form fluosilicic acid:

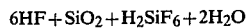

The liquid in the co-current absorber 2 is transferred by pipe 7 to the circulating liquor vessel 12, from where it is fed into the co-current absorber for irrigation by the centrifugal pump 13. As it attains a concentration of up to about 30 percent $H_2SiF_6$, the liquid is transferred from the circulating liquor vessel 12 into the fluosilicic acid product vessel 14.

The temperature of the unit for recovering fluorine is the equilibrium temperature of the vapor at a given pressure. The co-current absorber 2 operates at a vacuum of about 100 to about 740 mmHg., and the temperature of the vapor under these conditions is about 20° to about 95° C.

With reference to FIG. II, the co-current absorber 2 comprises a substantially vertical outer enclosure container means, such as a housing 30. The housing 30 can be an integral unit, or sectional and joined by means of flanges as required. The housing 30, having an upper portion 111 and a lower portion 112 with openings for inlet ports and exit ports described as follows: In the upper portion 111 positioned at the extreme top and entering into condenser housing 30, an entry port 109 for pipe 18 and outlet 101 is provided for the introduction of a circulating liquor from vessel 12 into the co-current absorber 2. Positioned in the wall of said housing 30 in the upper portion 111 thereof is an entry port 102 for the introduction of vapors through pipe 1 from evaporator 16. In the upper portion 111 of said housing 30 is an exit port 103 for the removal through pipe 8 into vessel 11 of any collected liquid in the upper portion 111 of the co-current absorber 2 prior to passage into and through the co-current absorber. In the lower portion 112 of said housing 30 there is an exit port 104 for removal through pipe 6 of vapors remaining after passage through the co-current absorber 2. At the bottom of the lower portion 112 of said housing 30, there is provided a liquid outlet 105 attached to pipe 7 leading to the circulating liquor vessel 12.

With reference to FIG. III, within the housing 30, there is provided a means for a first cyclone entrainment separation 3, in the upper portion thereof. Said means for cyclone entrainment separation 3 is concentrically positioned within housing 30 which communicates and cooperates tangentially with the entry port 102 such that the entering gaseous vapors from pipe 1 cyclonically travel around the annular opening 32 produced by the wall of the condenser housing 30 and the annular wall 106 of the cyclone entrainment separator 3. The lower portion of the cyclone entrainment separator 3 is joined at 110 to the wall of the housing 30 of the co-current absorber 2. The cyclone entrainment separator 3 is of smaller cross-sectional dimension than the housing 30 so as to leave an annular opening 32 between said housing 30 and said cyclone entrainment separator 3. It is contemplated within the embodiments of this invention that the cyclone entrainment separator communicate and cooperate with entry port 102 along the center line of the entrainment separator, such that a double annular configuration would be produced.

A plurality of baffles 4 are rigidly positioned within the housing 30 between the upper portion 111 containing the cyclone entrainment separator 3 and the lower portion containing a second cyclone entrainment separator 5. The baffles 4 are preferably multiple in number and are arranged in a configuration, such that the outer edge of each baffle 4 approximately coincides in a vertical plane within the next adjacent baffle. The baffles 4 and baffles 108 are spacially arranged between the upper cyclone entrainment separator 3 and the lower cyclone entrainment separator 5 within housing 30.

With reference to FIG. IV, in the lower portion 112 of the housing 30, there is positioned a second cyclone entrainment separator 5. The second cyclone entrainment separator 5 is concentrically positioned within the housing 30. The upper portion 115 and lower portion 107 of the second cyclone entrainment separator 5 are joined with the inner wall of the housing 30. The housing 30 is annularly disposed around the second cyclone separator 5 so as to form the double annular space 33 therebetween. Said second cyclone entrainment separator 5 is of smaller cross-section dimension than the condenser housing 30, such that a donut-shaped opening, annular space 33, exists between said second cyclone entrainment separator 5 and the housing 30. With said wall of said second cyclone separator 5 is formed an inner space 34. In the wall of the second cyclone separator 5, there is an opening 35, such as a vertical slot the length of the separator wall. The opening 35 is positioned opposite and away from the vapor exit port 104. An extension 120 of exit port 104 is circumferentially disposed around exit port 104 within the housing 30 in the annualar space 33. The extension 120 around exit port 104 prevents de-entrained liquid from entering exit port 104.

Utilizing the apparatus of the co-current absorber 2 described above, exit vapors from a wet process phosphoric acid evaporator 16 under reduced pressure enters the co-current absorber through pipe 1 by inlet port 102. The vapors cyclonically travel around the annular space 32 between the upper cyclonic entrainment separator 3 and the housing 30. The vapors rise to the top of the separator wall 106 of the upper cyclonic entrainment separator 3, then pass through the opening 31 formed by the separator wall 106. At this point, the vapors have been separated from any liquid particles entrained and carried over from the evaporator 16. The vapors contact the circulated liquor emitted from pipe 18 and outlet 101 in the upper portion 111 of the co-current absorber 2. The outlet 101 is directed downwardly in close proximity to the center of the opening 31 of the upper cyclonic entrainment separator 3.

The wetted vapors fall in a co-current flow through the co-current absorber 2, encountering baffles 108 and baffles 4. At each stage of the co-current absorber 2, the droplets are renewed resulting in a renewed droplet surface area, thereby increasing absorption efficiency. This high absorption efficiency, resulting from the baffled arrangement, is highly desirable in decreasing equipment size.

Before exiting the co-current absorber 2, the vapors are forced to exit through the second cyclone entrainment separator 5 in the lower portion 112 of the co-current absorber 2. The vapors exit through a vertical slot 35 in the wall of the lower cyclone entrainment separator 5. The vapors immediately impinge upon the wall 10 of the co-current absorber 2. This causes a splitting of the vapor stream and cyclonic rotation of the vapors with the curved outer wall before exiting through exit port 104 through pipe 6 to a condenser 17. The cyclonic rotation causes de-entrainment of liquor entrained in the vapor. In the lower cyclone entrainment separator 5, de-entrained liquor is collected in space 33 and drains into pipe 7 through port 116 to the circulating liquor vessel 12. The recirculating liquor rich in fluosilicic acid, after passing through the co-current absorber, drains into pipe 7 to the circulating liquor vessel 12 for recirculation. Exit port 104 is located in the wall of housing 30 opposite and away from the vertical slot 35 in the wall of the lower cyclone entrainment separator 5.

Broadly considered, the steps of this process may be performed in a continuous or batch-wise operation. The invention is dependent upon the relative positioning and spacing of a plurality of baffles 4 and baffles 108 in the housing 30. The upper cyclonic entrainment separator 3 must be concentrically positioned in the housing 30 and communicate efficiently with the inlet port 102 to force the entering vapors to travel around the annular opening 32 formed by the upper cyclonic entrainment separator 3 and the housing 30. The lower cyclonic entrainment separator 5 must have a slot 35 or other opening therein positioned away from exit port 104.

It is contemplated within this invention that a double annular cyclonic entrainment separator, as represented in the lower portion 112 in FIG. II and FIG. III, can be employed in the upper portion of the co-current absorber 2. Conversely, a tangential-annular cyclonic entrainment separator, as represented in the upper portion 111 in FIG. II and FIG. III, can be employed in the lower portion of the co-current absorber 2.

FIG. V and FIG. VI refer to a preferred embodiment of the co-current absorber which comprises a deflection plate 117 downwardly and angularly mounted in the second cyclone entrainment separator 5 in the lower portion 112 of the housing 30. The deflection plate 117 is mounted to the upper portion 115 of second cyclone entrainment separator 5 and extends the width of the opening 34 and over the opening 35. From the point of mounting, the deflection plate extends angularly and downwardly into the inner space 34 of the second cyclone entrainment separator. Preferably, the deflection plate 117 does not extend beyond the vertical center line of the housing 30. The preferred embodiment also includes a drain pipe 118 cooperating with the annular space 33. The drain pipe 118 extends downwardly and into a seal box 119 for collecting de-entrained liquid.

The preferred embodiments described with reference to FIG. V and FIG. VI hereinabove, permit the extremely efficient operation of the co-current scrubber at low pressures present with high vacuum conditions. Whereas the co-current scrubber operates satisfactorily at all reduced pressures, the preferred embodiments encompassing the modifications in the lower portion 112 of the co-current absorber of the deflection plate 117 and drain pipe 118 and seal box 119 have been found desirable at lower sub-atmospheric pressures in order to prevent an excessive amount of entrained liquid droplets from entering the second cyclonic entrainment separator 33.

Utilizing the preferred embodiments, the vapors, before exiting the co-current absorber 2, are forced to exit through the second cyclone entrainment separator 5. The vapors are deflected by deflector plate 117 and are forced out and away from the vertical slot 35 in the wall of the lower cyclone entrainment separator 5. Ultimately, the vapors are drawn by the vacuum around the deflection plate 117 and through the vertical slot leading to the annular space 33. In the deflection and high velocity flow around the deflection plate, substantial entrained liquid is de-entrained. The remaining entrained liquid droplets in the vapor are easily de-entrained in the annular space 33 as the vapor stream cyclonically rotates along the outer wall of the housing 30 to exit through port 104. The de-entrained liquid in annular space 33 drains into pipe 118 and into the seal box 119. As the seal box 119 fills, the collected liquid overflows and drains through exit port 105 into pipe 7.

The following examples illustrate the invention and the results which can be obtained therewith.

EXAMPLE I

The effect of the removal of entrained phosphoric acid from the entering vapors is illustrated by the $P_2O_5$ content of the product fluosilicic acid.

| Plant Where Produced | % $H_2SiF_6$ | % $P_2O_5$ | Cyclonic Entrainment Separator |
|---|---|---|---|
| Plant A | 23 | 1.2–2.8 | NO |
| Plant B | 23 | 0.36 | NO |
| Plant C | 23 | 0.033–0.137 | YES |

EXAMPLE II

The effect of removing entrained fluosilicic acid from the existing vapors from a wet phosphoric acid process evaporator is illustrated by operating the fluosilicic acid co-current absorber without a cyclonic entrainment separator. When this was done there was no net recovery of fluosilicic acid, because the product was carried out of the co-current absorber as fast as it was formed.

A cyclonic entrainment separator, described in this invention, was installed substantially as described hereinabove. The co-current absorber cyclonic separator operated at 60 mmHg. absolute pressure recovered 93% of the entering fluorides into a recirculating liquor containing 9% fluosilicic acid. Comparison with vapor pressure data showed that the exiting vapor from the co-current absorber was substantially in equilibrium with the 9% fluosilicic acid. Entrainment losses of fluorine values through the exiting vapors were negligible.

Various changes and modifications may be made without departing from the spirit and scope of the invention described herein as will be apparent to those skilled in the art to which it pertains. It is accordingly intended that the present invention shall only be limited by the scope of the appended claims.

What is claimed is:

1. In a set phosphoric acid process for recovery of fluorine values in which weak phosphoric acid containing fluorine values is introduced into an evaporator, passing weak phosphoric acid from the evaporator through a heater and back into the evaporator, maintaining a reduced pressure in the entire system, the improvement comprising:

passing the vapors containing HF and $SiF_4$ from the evaporator into a vertical co-current absorber having a first cyclone entrainment separator;

removing entrained liquid from said vapors in said first cyclone entrainment separator;

contacting said vapors with recirculating liquor containing aqueous fluosilicic acid;

passing said vapors with said recirculating liquor co-currently through said vertical co-current absorber having a plurality of baffles rigidly and spacially mounted within said co-current absorber;

separating said vapors and recirculating liquor in a second cyclone entrainment separator and removing the non-reacted vapors and recovering the recirculating liquor containing fluosilicic acid;

transferring aqueous fluosilicic acid to a product vessel as the recirculating liquor containing fluosilicic acid attains a concentration of up to about 30% fluosilicic acid.

* * * * *